(12) United States Patent
Jiang et al.

(10) Patent No.: US 10,659,700 B2
(45) Date of Patent: May 19, 2020

(54) MOBILE TERMINAL AND METHOD FOR FILLING LIGHT FOR SAME

(71) Applicants: HISENSE MOBILE COMMUNICATIONS TECHNOLOGY CO., LTD., Qingdao (CN); HISENSE USA CORPORATION, Suwanee, GA (US); HISENSE INTERNATIONAL CO., LTD., Qingdao (CN)

(72) Inventors: Peng Jiang, Qingdao (CN); Xing Yang, Qingdao (CN); Qi He, Qingdao (CN)

(73) Assignees: HISENSE MOBILE COMMUNICATIONS TECHNOLOGY CO., LTD., Shandong (CN); HISENSE USA CORPORATION GA (US); HISENSE INTERNATIONAL CO., LTD., Shandong (CN)

( * ) Notice: Subject to any disclaimer, the term of this patent is extended or adjusted under 35 U.S.C. 154(b) by 235 days.

(21) Appl. No.: 15/866,296

(22) Filed: Jan. 9, 2018

(65) Prior Publication Data
US 2019/0037125 A1 Jan. 31, 2019

(30) Foreign Application Priority Data
Jul. 27, 2017 (CN) .......................... 2017 1 0623153

(51) Int. Cl.
*H04N 5/222* (2006.01)
*H04N 5/235* (2006.01)
(Continued)

(52) U.S. Cl.
CPC .......... *H04N 5/2354* (2013.01); *G03B 15/03* (2013.01); *H04N 5/2256* (2013.01);
(Continued)

(58) Field of Classification Search
CPC ............. H04N 5/2256; H04N 5/23222; H04N 5/23293; H04N 5/2354; G09G 2320/06
See application file for complete search history.

(56) References Cited

U.S. PATENT DOCUMENTS

2005/0040774 A1* 2/2005 Mueller ............... H05B 47/155
315/291
2009/0245775 A1* 10/2009 Osawa ................... G03B 15/02
396/61
(Continued)

FOREIGN PATENT DOCUMENTS

| CN | 104754203 A | 7/2015 |
|---|---|---|
| CN | 106210536 A | 12/2016 |
| CN | 106791468 A | 5/2017 |

OTHER PUBLICATIONS

The Chinese First Examination Report, including the Search Report of corresponding Chinese application No. 201710623153.5, dated Mar. 19, 2019.

*Primary Examiner* — Sinh Tran
*Assistant Examiner* — Selam T Gebriel
(74) *Attorney, Agent, or Firm* — J.C. Patents

(57) ABSTRACT

The present disclosure provides a mobile terminal and a method for filling light for same, and relates to the field of electronic technologies. The method includes: upon receiving an activating instruction for a target camera, activating the target camera; displaying an image acquired by the target camera on a display screen which is located on a surface different from a surface where the target camera is located; detecting brightness of present ambient light, and in response to that the brightness of the present ambient light is less than a preset brightness threshold, illuminating the display screen on the same surface where the target camera is located.

14 Claims, 6 Drawing Sheets

(51) Int. Cl.
*H04N 5/232* (2006.01)
*H04N 5/225* (2006.01)
*G03B 15/03* (2006.01)
*H04N 9/73* (2006.01)

(52) U.S. Cl.
CPC ....... *H04N 5/2351* (2013.01); *H04N 5/23219* (2013.01); *H04N 9/735* (2013.01); *G09G 2320/0666* (2013.01); *G09G 2360/14* (2013.01); *G09G 2360/16* (2013.01)

(56) References Cited

U.S. PATENT DOCUMENTS

| | | | |
|---|---|---|---|
| 2010/0066864 A1* | 3/2010 | Abe | H04N 5/23209 348/240.3 |
| 2010/0194931 A1* | 8/2010 | Kawaguchi | H04N 5/232 348/240.99 |
| 2011/0117959 A1* | 5/2011 | Rolston | A46B 7/04 455/556.1 |
| 2013/0050233 A1* | 2/2013 | Hirsch | G06F 3/038 345/589 |
| 2015/0189138 A1* | 7/2015 | Xie | H04N 5/2256 348/222.1 |
| 2015/0350511 A1* | 12/2015 | Kaikumaa | G03B 7/00 348/363 |
| 2017/0134625 A1* | 5/2017 | Salazar | H04N 5/2256 |

* cited by examiner

MOBILE TERMINAL AND METHOD FOR FILLING LIGHT FOR SAME

CROSS-REFERENCE TO RELATED APPLICATION

This application claims priority to Chinese Patent Application No. 201710623153.5, filed on Jul. 27, 2017, entitled "Mobile terminal and method for filling light for same", which is incorporated herein by reference in its entirety.

TECHNICAL FIELD

The present invention relates to the field of electronic technologies, in particular, to a mobile terminal and a method for filling light for the mobile terminal.

BACKGROUND

Currently, a flash is generally set up next to a camera of a mobile terminal to ensure the photographic effect of the camera of the mobile terminal, as the flash can fill light for a subject in a dark shooting environment.

However, the brightness of the flash is generally high, thereby easily resulting in an over-exposure phenomenon and poor performance for filling light. Moreover, filling light with the flash in a close range stimulates eyes, and especially endangers children.

SUMMARY

In order to solve the problem in related art that the mobile terminal uses a flash light to fill light and leads to the over-exposure phenomenon and poor performance for filling light. The present application provides a mobile terminal and a method for filling light for the mobile terminal. The technical solution is as follows:

In a first aspect, it provides a method for filling light for a mobile terminal, the mobile terminal includes: a main body, a first screen located on a front surface of the main body and a second screen located on a back surface of the main body, wherein both the front surface and the back surface are provided with a camera, the method including:

upon receiving an activating instruction for a target camera, activating the target camera;

displaying an image acquired by the target camera on a display screen which is located on a surface different from a surface where the target camera is located;

detecting brightness of present ambient light, and in response to that the brightness of the present ambient light is less than a preset brightness threshold, illuminating the display screen on the same surface where the target camera is located.

In a second aspect, it provides a mobile terminal, the mobile terminal includes: a main body, a first screen located on a front surface of the main body and a second screen located on a back surface of the main body, wherein both the front surface and the back surface are provided with a camera, and the mobile terminal further includes:

an activating module, configured to activate a target camera upon receiving an activating instruction for the target camera;

a displaying module, configured to display an image acquired by the target camera on a display screen which is located on a surface different from a surface where the target camera is located;

an illuminating module, configured to detect the brightness of the present ambient light, and in response to that the brightness of the present ambient light is less than the preset brightness threshold, illuminate the display screen on the same surface where the target camera is located.

In a third aspect, it provides a mobile terminal, including: a main body, a first screen located on a front surface of the main body and a second screen located on a back surface of the main body; wherein both the front surface and the back surface of the main body are provided with a camera; wherein the mobile terminal further includes: a memory for storing instructions; a processor coupled with the memory and configured to execute the instructions stored in the memory to:

upon receiving an activating instruction for a target camera, activate the target camera;

display an image acquired by the target camera on a display screen which is located on a surface different from a surface where the target camera is located;

detect brightness of present ambient light, and in response to that the brightness of the present ambient light is less than a preset brightness threshold, illuminating the display screen on the same surface where the target camera is located.

In a fourth aspect, provides a computer readable storage medium having instructions stored therein, which, when executed on a computer, causes the computer to perform the method for filling light for the mobile terminal according to the first aspect.

DESCRIPTION OF EMBODIMENTS

To describe the purpose, technical solutions and advantages in the embodiments of the present application more clearly, implementations of the technical solutions of the present invention will be further described in detail in combination with drawings and specific embodiments.

The mobile terminal of the present application includes: a main body, a first screen located on a front surface of the main body and a second screen located on a back surface of the main body, where both the front surface and the back surface are provided with a camera. In the present application, the front surface and the back surface of the main body are equivalent, i.e., both surfaces have functions of displaying and touching operation. There are two kinds of situations in practice, one situation is that both of the front surface and the back surface are liquid crystal or organic light-emitting diode (OLED) display screens or the like, the other situation is that one surface is a liquid crystal or OLED display screen, while the other surface is an ink screen, a backlight is provided in the ink screen. For example, the mobile terminal is a cell phone.

Figure 1A:
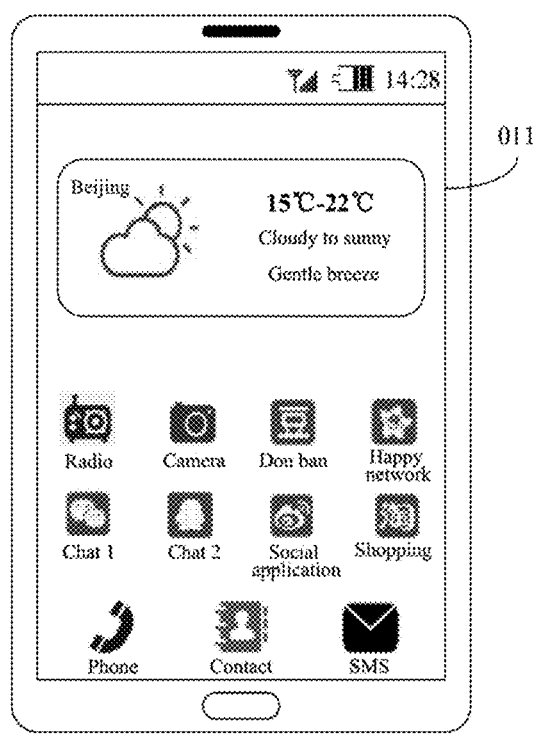
FIG. 1A is a schematic view of a surface of a mobile terminal provided with a liquid crystal display or an OLED display in an implementation manner according to an embodiment of the present application.
Figure 1B:
FIG. 1B is a schematic view of the other surface of a mobile terminal provided with an ink screen in an implementation manner according to an embodiment of the present application.

FIG. 1A is a schematic view of a surface of a mobile terminal provided with a liquid crystal display or an OLED display in an implementation manner according to an embodiment of the present application. FIG. 1B is a schematic view of the other surface of a mobile terminal provided with an ink screen in an implementation manner according to an embodiment of the present application. In an optional implementation of the embodiment of the present application, a liquid crystal display screen 011 shown in FIG. 1A is provided on one surface of the mobile terminal, and the other surface of the mobile terminal is provided with a ink screen 012 shown in FIG. 1B, information such as time and weather is displayed therein, and the ink screen is equipped with a backlight. In another optional implementation of the embodiment of the present application, a liquid crystal display screen 011 shown in FIG. 1A is provided on both surfaces of the mobile terminal.

Figure 2:
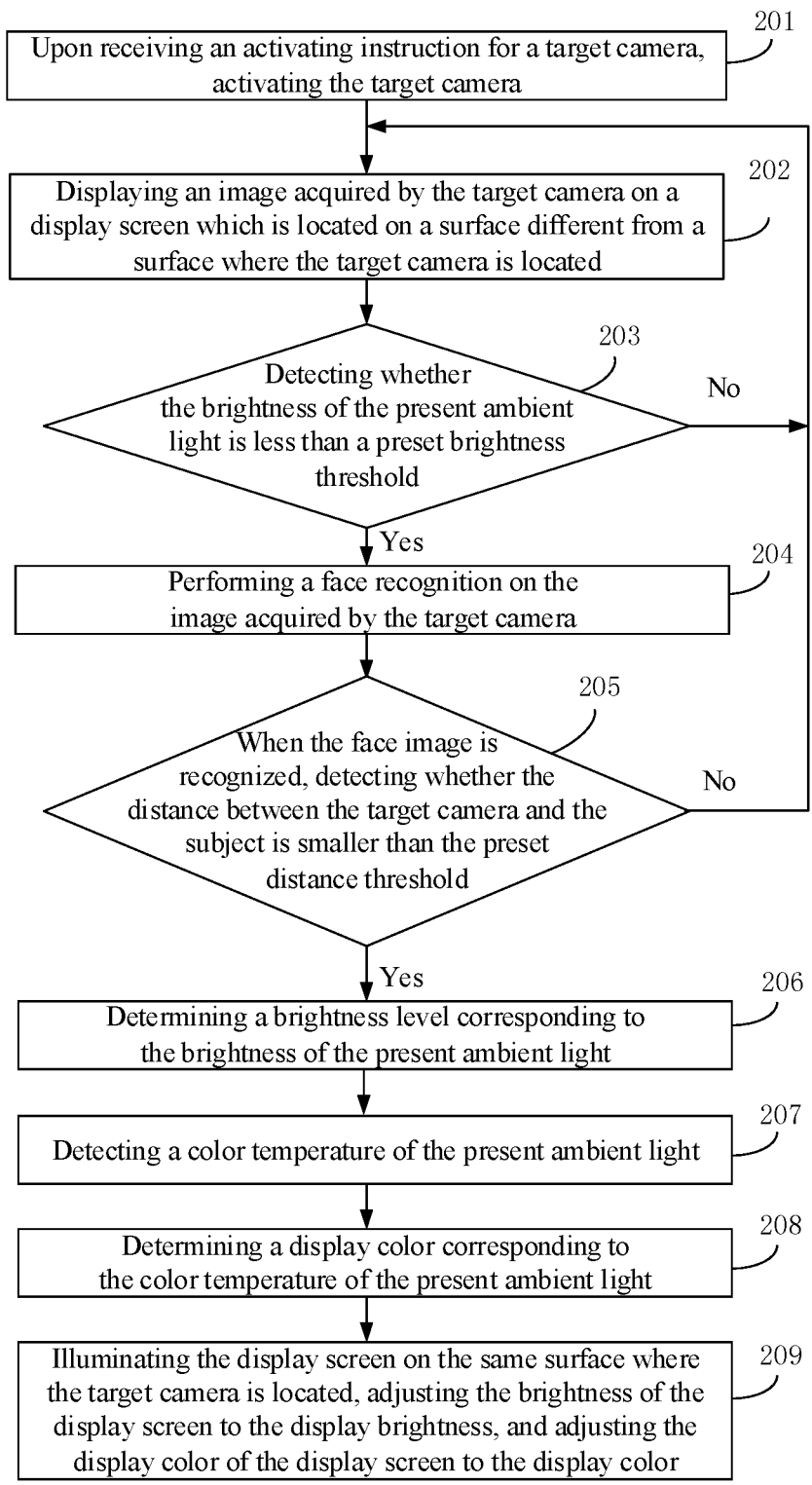
FIG. 2 is a flowchart of a method for filling light for a mobile terminal according to an embodiment of the present application.

FIG. 2 is a flowchart of a method for filling light for a mobile terminal according to an embodiment of the present application. The method is applied to the mobile terminal as shown in FIG. 1A or FIG. 1B. Referring to FIG. 2, the method specifically includes:

Step 201, upon receiving an activating instruction for a target camera, activating the target camera;

In the embodiment of the present application, a camera application is installed in the mobile terminal, and the camera application is a system application or a third-party application. When a user clicks on any one of camera application icons through a click operation, the mobile terminal receives an activating instruction, where the activating instruction includes an identifier of a target camera to be started. The target camera is a preset camera in the mobile terminal, a camera of the mobile terminal started last time, or a camera selected by the user. The mobile terminal may start a corresponding target camera according to the received activating instruction.

As an example the two display screens of the mobile terminal include a first screen and a second screen, the camera on the front surface of the main body is a rear camera, the camera on the back surface of the main body is a front camera, and the preset camera in the mobile terminal is a rear camera. When a user clicks on the camera icon, the mobile terminal may receive the activating instruction, and the identifier of the camera carried in the activating instruction is the identifier of the rear camera. Therefore, the mobile terminal may start the rear camera according to the received activating instruction to photograph or record a video.

Step 202: displaying an image acquired by the target camera on a display screen which is located on a surface different from a surface where the target camera is located.

In the embodiment of the present application, after starting a target camera, the mobile terminal displays the image acquired by the target camera on a display screen (a display screen that can be seen by the photographer) which is located on a surface different from a surface where the target camera is located, so that the photographer can preview the acquired image in real time. The image acquired by the target camera is all images that can be acquired by the target camera after the target camera is opened.

Figure 3:
FIG. 3 is a schematic view of displaying an image collected by a target camera by a mobile terminal according to an embodiment of the present application.

As an example as shown in FIG. 3, after starting the rear camera, the mobile terminal displays the image acquired by the rear camera on the display screen 011 locating on a different surface from the rear camera.

Step 203: detecting whether the brightness of the present ambient light is less than a preset brightness threshold.

In the embodiment of the present application, a light sensor is provided in the mobile terminal, and the light sensor detects the brightness of ambient light in real time. In practical applications, the mobile terminal may pre-store a preset brightness threshold value since there is no need to fill light for the subject in a bright shooting environment. When the mobile terminal detects that the brightness of the present ambient light is less than the preset brightness threshold, it is determined that the current photographing environment is relatively dark, and it is necessary to fill light for the subject. Therefore, step 204 is performed; when the mobile terminal detects that the brightness of the present ambient light is not less than the preset brightness threshold, it is determined that the current photographing environment is bright and there is no need to fill light for the subject, step 202 may thus be performed instead of executing the operation of filling light. The preset brightness threshold is a brightness value pre-configured in the mobile terminal.

As an example, the preset brightness threshold value is 20 lux (lux is the measurement unit of luminance indicating the brightness of light). When the mobile terminal detects that the present ambient light has a brightness of 15 lux, since the brightness is less than 20 lux, it is determined that the current photographing environment is dark, and it is necessary to fill light for the subject. Therefore, step 204 is performed; when the mobile terminal detects that the brightness of the present ambient light is 30 lux, since the brightness is greater than 20 lux, the mobile terminal determines that the current photographing environment is bright and there is no need to fill light for the subject, step 202 may thus be performed, i.e., continuing to display the image acquired by the target camera, on the display screen which is located on a surface different from a surface where the target camera is located, without performing the filling operation.

It should be noted that in the embodiment of the present application, besides detecting the brightness of the ambient light according to the light sensor, the mobile terminal may further acquire exposure parameters of the image data collected by the target camera, such as a line count and a gain, and determine the brightness of the present ambient light according to the exposure parameter. Specifically, the mobile terminal calculates an exposure time according to the line count and the gain, where the exposure time is a product of the line count and the gain. Further, according to a pre-stored correspondence between the exposure time and the ambient light brightness, the mobile terminal determines the ambient light brightness corresponding to the currently calculated exposure time. The darker the shooting environment is, the longer the exposure time becomes. Therefore, in this correspondence, the ambient brightness is negatively related to the exposure time.

As an example, provided that the line count detected by the mobile terminal is 10000, and the gain detected by the mobile terminal is 3.0, the mobile terminal then calculates the present exposure time as 10000×3.0=30000; further, the mobile terminal may determine, according to the pre-stored correspondence between the exposure time and the ambient light brightness, the ambient light brightness corresponding to the currently calculated exposure time 30000 is 10 lux. Since the present ambient brightness of 10 lux is less than the preset brightness threshold of 20 lux, the mobile terminal determines that it is necessary to fill light for the subject, step 204 thus is performed.

Step 204: performing a face recognition on the image acquired by the target camera.

Further, when the subject is a human being, generally it is necessary to fill light. Thus, the mobile terminal may perform the face recognition on the image acquired by the target camera according to a preset face recognition algorithm. For the specific process of recognizing a human face image according to the face recognition algorithm, reference is made to related technologies, which is not repeated again in the embodiment of the present application.

When the face image is recognized, the mobile terminal determines that there is a person in the current subject and it is necessary to fill light for the subject, so step 205 is performed; when the face image is not recognized, the mobile terminal determines that there is no one in the current subject and there is no need to fill light for the subject, so step 202 is performed, i.e. no filling light operation is performed any more. Certainly, in some embodiments, it is also possible to apply a filling light operation when photographing an article such as a cup, a food or a shoe.

Step 205: when the face image is recognized, detecting whether the distance between the target camera and the subject is smaller than the preset distance threshold.

Since in practical application, when the distance between the target camera and the subject is far, the performance of filling light is not significant, so a preset distance threshold is pre-stored in the mobile terminal. The mobile terminal may detect the distance between the target camera and the subject before performing the screen filling. When the distance between the target camera and the subject is less than the preset distance threshold, the mobile terminal may determine that the effect of filling light for the subject through the screen is better, may thus perform steps 206 and 207; when the distance between the target camera and the subject is not less than the preset distance threshold, the mobile terminal may determine that little effect will be rendered by filling light through the screen at this moment, and therefore, may continue step 202, i.e., no screen filling operation is performed any more. At this time, the user may control the mobile terminal to start the flash and perform the filling light operation though the flash; alternatively, the mobile terminal may automatically activate the flash to fill light. The preset distance threshold is a preconfigured distance value in the mobile terminal, or is a distance value autonomously set by the user, which is not limited in the embodiment of the present application.

Specifically, when detecting the distance between the target camera and the subject, the mobile terminal may firstly focus on the subject through the target camera, during the focusing process, the mobile terminal may push the camera by virtue of the zoom motor so that the image of the subject is clearly displayed on the display screen. At the same time, the mobile terminal may detect the preset current in the zoom motor and determine, according to a pre-stored correspondence between a current value and a lens pushing distance, a moving distance corresponding to the present current for the zoom motor to push the target camera. Further, the mobile terminal may determine, according to a pre-stored correspondence between a lens pushing distance and a shooting distance, the shooting distance corresponding to a distance that the zoom motor currently pushes the lens to move. The shooting distance refers to a distance between a target camera and a subject. Where the distance that the zoom motor pushes the lens to move is inversely proportional to the shooting distance, i.e., the farther the distance that the zoom motor drives the lens to move is, the closer the distance between the target camera and the subject becomes.

Certainly, in the embodiment of the present application, the correspondence between the current value and the shooting distance may also be directly stored in the mobile terminal. When detecting the present current in the zoom motor, the mobile terminal may directly determine the distance between the current target camera and the subject according to the correspondence between the current value and the shooting distance. As an example, the mobile terminal may measure, in advance, the current flowing through the zoom motor under different shooting distance values (for example, 30 cm, 60 cm, 1 m, 3 m, etc.), and based on measuring results, establish and store the correspondence between the current value and shooting distance.

As an example, assuming that the preset distance threshold is 1 meter, when the mobile terminal recognizes a face image in the shooting image shown in FIG. 3, the camera may focus on the subject through the rear camera, and a current of 100 microamperes (uA) may pass through the zoom motor, and the distance between the target camera and the subject determined by the mobile terminal through the correspondence between the current value and the shooting distance is 60 centimeters. Since the distance is less than 1 meter, the mobile terminal may determine that the effect of filling light for the subject through the filling light screen is better, may thus perform steps 206 and 207. The filling light screen herein is a screen used to fill light for the target camera, i.e., a display screen located on the same surface where the target camera is located; if the mobile terminal detects that the value of the current passing through the zoom motor is 50 uA and the distance between the target camera and the subject determined by the mobile terminal through the correspondence between the current value and the shooting distance is 1.5 meters. Since the distance is more than 1 meter, the mobile terminal may determine that filling light through screen is not very effective at this time, and step 202 may thus be continued.

Step 206: determining a brightness level corresponding to the brightness of the present ambient light.

In the embodiments of the present application, in order to improve the performance of filling, the correspondence between the brightness of the ambient light and the brightness level of the filling light screen is pre-stored in the mobile terminal, where the brightness level of the fill light screen is used for indicating the brightness level of the filling light screen. In this correspondence, the brightness level is inversely proportional to the brightness of the ambient light, i.e., the lower the brightness of the ambient light is, the higher the brightness level is. Therefore, after determining the brightness of the present ambient light, the mobile terminal may further determine the brightness level corresponding to the present ambient light according to the correspondence and further determine a display brightness of the display screen according to the brightness level, so as to fill different degrees of light for the subject.

As an example, as shown in Table 1, the mobile terminal may pre-store the correspondence between the brightness of the ambient light, the ambient brightness level, the brightness level and the display brightness of the filling light screen. The ambient brightness level is used to indicate the level of the ambient light brightness, the darker the ambient light is, the lower the ambient brightness level is. when the brightness of the ambient light is less than 10 lux, the corresponding ambient brightness level is: level four; the ambient brightness level is: a brightness level corresponding to the level four is level one; the brightness level of the filling light screen: a display brightness of the filling light screen level corresponding to the level one is 750 lux. Assuming that the brightness of the present ambient light detected by the mobile terminal is 13 lux, according to the correspondence shown in Table 1, the mobile terminal may determine that the ambient brightness level corresponding to the present ambient light brightness is level 3, and correspondingly, the brightness level of the filling light screen is level two, and further determine that the display brightness of the filling light screen is 750 lux.

TABLE 1

| Ambient light brightness (unit: lux) | Ambient brightness level | Brightness level of the filling light screen | Display brightness of the filling light screen (unit: lux) |
| --- | --- | --- | --- |
| 10 or less | Level four | Level one | 750 |
| 11-15 | Level three | Level two | 700 |
| 16-20 | Level two | Level three | 650 |
| 21-25 | Level one | Level four | 550 |

Step 207: detecting a color temperature of the present ambient light.

In the embodiment of the present application, in order to further improve the performance of filling light, a color temperature sensor is further provided in the mobile terminal. After activating the target camera, the mobile terminal may detect the color temperature of the present ambient light via the color temperature sensor. The color temperature is a scale representing a light color of a light source.

Step 208: determining a display color corresponding to the color temperature of the present ambient light.

In the embodiment of the present application, the mobile terminal may pre-store the correspondence between the color temperature of the ambient light and the display color, where the display color is the display color of the filling light screen. In the correspondence, the color indicated by the color temperature of the ambient light and the corresponding display color is a complementary color, thereby achieving a good performance of filling light. After determining the color temperature of the present ambient light, the mobile terminal determines, according to the pre-stored correspondence between the color temperature of the ambient light and the display color, a display color corresponding to the color temperature of the present ambient light, so as to fill light for the subject with different colors.

As an example, as shown in Table 2, the mobile terminal may pre-store the correspondence between the color temperature of the ambient light and the display color of the filling light screen, where the display color is blue when the color temperature of the ambient light is less than 3000 Kelvin (K). Assuming that the mobile terminal detects that the color temperature of the present ambient light is 3000K, according to the correspondence shown in Table 2, the mobile terminal may determine that the display color of the filling light screen is white.

TABLE 2

| Color temperature of the ambient light (unit: K) | Display color of the filling light screen |
| --- | --- |
| <3000 | Blue |
| 3000-5000 | White |
| >5000 | Red |

Step 209: illuminating the display screen on the same surface where the target camera is located, adjusting the brightness of the display screen to the display brightness, and adjusting the display color of the display screen to the display color.

Further, the mobile terminal may illuminate a display screen on the same surface where the target camera is located, i.e., a display screen facing the subject, adjusting the display screen which faces to the subject, to a predetermined display brightness, in order to fill light for the subject. Since the display brightness is determined by the mobile terminal according to the brightness of the present ambient light, and the display color is determined by the mobile terminal according to the color temperature of the present ambient light, thereby improving the performance of filling light through the screen.

Figure 4:
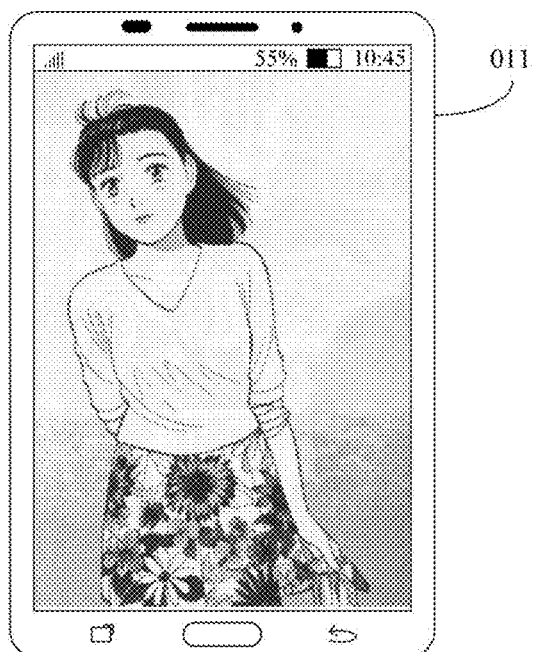
FIG. 4 is a schematic view of filling light for a subject with a display screen on the same surface where the target camera is located according to an embodiment of the present application.
Figure 5:
FIG. 5 is a schematic view of using a flash light to fill light for a subject in related art.

As an example, the mobile terminal may illuminate a display screen on the same surface where the rear camera locates is located, i.e., a second screen 012 of the mobile terminal, at this time, the second screen 012 is the filling light screen. When the display brightness determined by the mobile terminal is 700 lux and the determined display color is white, the brightness of the display screen is adjusted to 700 lux when the mobile terminal illuminates the second screen 012, and adjusts the display color thereof to white. In this case, the preview image displayed on the display screen 011 which is located on a surface different from a surface where the rear camera is located is shown in FIG. 4. As can be seen from comparing with the preview image shown in FIG. 3 without being filled, after filling light through the second screen, the shooting effect has been effectively improved. Further, FIG. 5 is a schematic view of using a flash light to fill light for a subject in related art. Comparing FIG. 4 and FIG. 0.5, it can be seen that the captured images may easily experiences an over-exposure phenomenon when filling light is performed through the flash. However, according to the method provided in the embodiment of the present application, when filling light through the second screen, the light emitted from the second screen is softer, thereby avoiding the over-exposure phenomenon on the captured image, and achieving a better filling performance.

It should be noted that, in the embodiment of the present application, the screen for filling light, i.e., the display screen on the same surface where the target camera is located, is an OLED display screen, a liquid crystal display screen or an ink screen. Since the OLED display screen is self-luminous, while the liquid crystal display screen and the ink screen are shined by virtue of a backlight, therefore, for the OLED display, illuminating the display screen means to illuminate the display screen to illuminate by itself. For the liquid crystal display screen and the ink screen, illuminating the display screen means to illuminate the backlight of the liquid crystal display or the ink screen.

Figure 6:
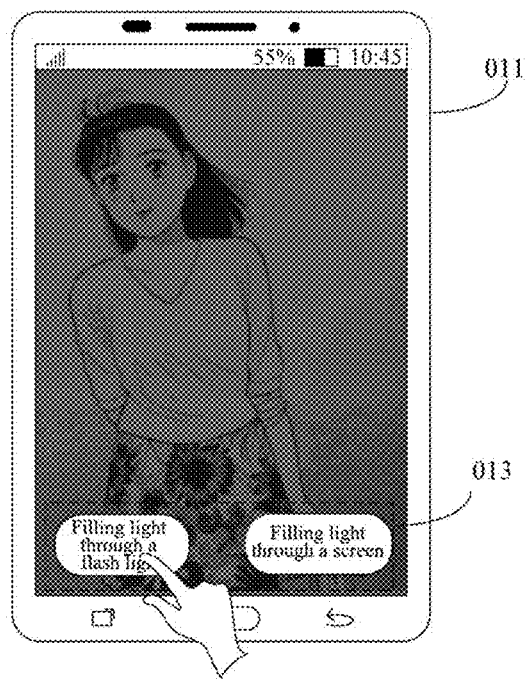
FIG. 6 is a schematic view of displaying a filling light option on a display screen which is located on a surface different from a surface where the target camera is located according to an embodiment of the present application.

It should also be noted that in an optional implementation of the embodiment of the present application, in order to facilitate the user to independently select a filing mode, in step 203, when the mobile terminal detects that the present ambient brightness is less than the preset brightness threshold, as shown in FIG. 6, a filling light option 013 may also be displayed on the display screen 011 which is located on a surface different from a surface where the target camera is located. The filling light option 013 includes filling light through a flash and filling light through a screen. The photographer may choose to fill light through a flash or a screen by performing a touch operation. When the mobile terminal detects that the filling light option selected by the user is to fill light through a screen, the mobile terminal may execute the aforementioned method for filling light shown in steps 206 to 209. When the mobile terminal detects that the filling light option selected by the user is to fill light through a flash, the mobile terminal may turn on the flash to fill light for the subject.

In another optional implementation of the embodiment of the present application, the mobile terminal may also automatically select a light filling mode. As an example, under a dark shooting environment, when a mobile terminal identifies a face image in an image acquired by the target camera, it is determined that there is a person in the current subject and it is necessary to fill light for the subject. As the light emitted from the display screen is softer, thereby avoiding the overexposure phenomenon, so the mobile terminal may choose to fill light for the subject through the screen. When the mobile terminal detects that the distance between the target camera and the subject is greater than the preset distance threshold or that the brightness of the ambient light is less than the preset minimum brightness threshold, since the effect of filling light through the screen is less effective at this time, the mobile terminal may choose to fill light for the subject through a flash. In the embodiment of the present application, an implementation of automatically selecting a light filling mode by a mobile terminal is adopted.

It should be further noted that, in the embodiment of the present application, when the mobile terminal fills light for the subject through a display screen on the same surface where the target camera is located, the mobile terminal may adjust the brightness level of the display screen on the same surface where the target camera is located (the display brightness of the display screen) in real time according to the brightness change of the present ambient light, and adjust the display color of the display screen on the same surface where the target camera is located in real time according to the color temperature change of the present ambient light.

It should also be noted that, the order of the steps of the method for filling light for the mobile terminal provided in the embodiments of the present application is adjusted appropriately, and the steps may also be increased or decreased depending on situations. For example, in one optional implementation, steps 204 to 208 are deleted depending on the situation, i.e., when detecting that the brightness of the present ambient light is less than the preset brightness threshold, the mobile terminal may directly illuminate the display screen on the same surface where the target camera is located, at this time, the display brightness and the display color are preconfigured.

In another optional implementation, step 205 is executed before step 204. That is, the mobile terminal may firstly detect the distance between the target camera and the subject, and if it is detected that the distance is less than the preset distance threshold, then perform the face recognition on the images acquired by the target camera, execute step 206 after recognizing the face image.

In addition, step 203 may also be executed before step 202 or simultaneously with step 202; steps 207 and 208 may also be executed before step 206. Within the technical scope disclosed in the present application, anyone who is familiar with the technical field may easily think of many variations and those variations should be covered within the protection scope of the present application, so details are not repeated herein again.

In summary, the embodiment of the present application provides a method for filling light for a mobile terminal, after activating the target camera, when the mobile terminal detects that the brightness of the present ambient light is less than the preset brightness threshold, the mobile terminal may illuminate the display screen on the same surface where the target camera is located to fill light for the subject. Since light is filled for the subject by the display screen, the light emitted from the display screen is softer and thus avoiding the phenomenon of overexposure, thereby improving the performance for filling light and increasing the shooting quality of the mobile terminal. Furthermore, filling light through the display light may prevent eyes from being hurt and, especially preventing children from being hurt.

Figure 7:
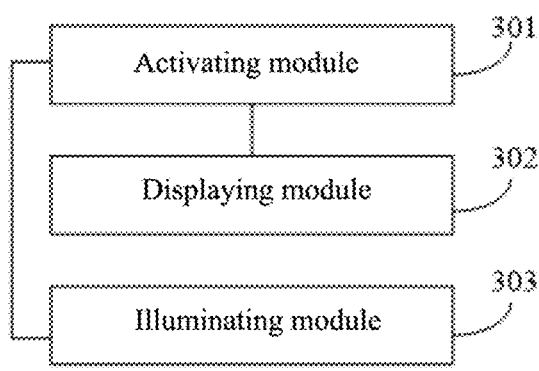
FIG. 7 is a schematic structural diagram of a mobile terminal according to an embodiment of the present application.

An embodiment of the present application further provides a mobile terminal, the mobile terminal includes: a main body, a first screen located on a front surface of the main body and a second screen located on a back surface of the main body; wherein both the front surface and the back surface are provided with a camera. FIG. 7 is a schematic structural diagram of a mobile terminal according to an embodiment of the present application. As shown in FIG. 7, the mobile terminal may further include:

an activating module 301, configured to activate a target camera upon receiving an activating instruction for the target camera;

a displaying module 302, configured to display an image acquired by the target camera on a display screen which is located on a surface different from a surface where the target camera is located;

an illuminating module 303, configured to detect the brightness of the present ambient light, and in response to that the brightness of the present ambient light is less than the preset brightness threshold, illuminate the display screen on the same surface where the target camera is located.

Optionally, the illuminating module 303 is configured to:
determine, before illuminating the display screen on the same surface where the target camera is located, that a face image is acquired by the target camera.

Optionally, the illuminating module 303 is configured to:
determine, before illuminating the display screen on the same surface where the target camera is located, that a distance between the target camera and a subject is less than a preset distance threshold.

Optionally, a zoom motor is provided in the main body; the illuminating module 303 is configured to:
detect a present current in the zoom motor; determine, according to a pre-stored correspondence between a current value and a lens pushing distance, a moving distance corresponding to the present current for the zoom motor to push the target camera; determine, according to a pre-stored correspondence between a lens pushing distance and a shooting distance, that the moving distance for the zoom motor to push the target camera is less than the preset distance threshold, wherein the shooting distance is a distance between the target camera and the subject.

Optionally, the illuminating module 303 is configured to:
adjust, according to the brightness of the present ambient light, a brightness level of the display screen on the same surface where the target camera is located.

Optionally, the illuminating module 303 is configured to:

adjust, according to a color temperature of the present ambient light, a display color of the display screen on the same surface where the target camera is located.

Optionally, the illuminating module 303 is configured to:

determine, according to a pre-stored correspondence between the color temperature of ambient light and a display color, a display color corresponding to the color temperature of the present ambient light; adjust the display color of the display screen on the same surface where the target camera is located to the determined display color.

Optionally, a light sensor for detecting ambient light brightness is provided in the main body; the illuminating module 303 is configured to:

determine, according to a detection result of the light sensor, the brightness of the present ambient light.

Optionally, the illuminating module 303 is configured to:

Obtain an exposure parameter of the image acquired by the target camera; determine, according to the exposure parameter, the brightness of the present ambient light.

In summary, the embodiment of the present application provides a mobile terminal, after activating the target camera, when the mobile terminal detects that the brightness of the present ambient light is less than the preset brightness threshold, the mobile terminal may illuminate the display screen on the same surface where the target camera is located to fill light for the subject. Since light is filled for the subject by the display screen, the light emitted from the display screen is softer and thus avoiding the phenomenon of overexposure, thereby improving the performance for filling light and increasing the shooting quality of the mobile terminal. Furthermore, filling light through the display light may prevent eyes from being hurt and, especially preventing children from being hurt.

The embodiment of the present application provides a mobile terminal, the mobile terminal includes: a main body, a first screen located on a front surface of the main body and a second screen located on a back surface of the main body; wherein both the front surface and the back surface of the main body are provided with a camera; wherein the mobile terminal further includes: a memory for storing instructions; a processor coupled with the memory and configured to execute the instructions stored in the memory to:

upon receiving an activating instruction for a target camera, activate the target camera;

display an image acquired by the target camera on a display screen which is located on a surface different from a surface where the target camera is located;

detect brightness of present ambient light, and in response to that the brightness of the present ambient light is less than a preset brightness threshold, illuminating the display screen on the same surface where the target camera is located.

Optionally, wherein the processor is further configured to execute the instructions stored in the memory to: determine, before illuminating the display screen on the same surface where the target camera is located, that a face image is acquired by the target camera.

Optionally, wherein the processor is further configured to execute the instructions stored in the memory to: determine, before illuminating the display screen on the same surface where the target camera is located, that a distance between the target camera and a subject is less than a preset distance threshold.

Optionally, wherein a zoom motor is provided in the main body;

wherein the processor is further configured to execute the instructions stored in the memory to: read a value of a present current flowing in the zoom motor;

determine, according to a pre-stored correspondence between a current value and a lens pushing distance, a moving distance corresponding to the present current for the zoom motor to push the target camera;

determine, according to a pre-stored correspondence between a lens pushing distance and a shooting distance, that the moving distance for the zoom motor to push the target camera is less than the preset distance threshold, wherein the shooting distance is a distance between the target camera and the subject.

Optionally, wherein the processor is further configured to execute the instructions stored in the memory to:

adjust, according to the brightness of the present ambient light, a brightness level of the display screen on the same surface where the target camera is located.

Optionally, wherein the processor is further configured to execute the instructions stored in the memory to:

adjust, according to a color temperature of the present ambient light, a display color of the display screen on the same surface where the target camera is located.

Optionally, wherein the processor is further configured to execute the instructions stored in the memory to:

determine, according to a pre-stored correspondence between the color temperature of ambient light and a display color, a display color corresponding to the color temperature of the present ambient light;

adjust the display color of the display screen on the same surface where the target camera is located to the determined display color.

Optionally, wherein a light sensor for detecting ambient light brightness is provided in the main body;

wherein the processor is further configured to execute the instructions stored in the memory to:

determine, according to a detection result of the light sensor, the brightness of the present ambient light.

Optionally, wherein the processor is further configured to execute the instructions stored in the memory to:

obtain an exposure parameter of the image acquired by the target camera;

determine, according to the exposure parameter, the brightness of the present ambient light.

In summary, the embodiment of the present application provides a mobile terminal, after activating the target camera, when the mobile terminal detects that the brightness of the present ambient light is less than the preset brightness threshold, the mobile terminal may illuminate the display screen on the same surface where the target camera is located to fill light for the subject. Since light is filled for the subject by the display screen, the light emitted from the display screen is softer and thus avoiding the phenomenon of overexposure, thereby improving the performance for filling light and increasing the shooting quality of the mobile terminal. Furthermore, filling light through the display light may prevent eyes from being hurt and, especially preventing children from being hurt.

For those skilled in the art, it is obvious that for the convenience and simplicity of the description, reference is made to the corresponding processes in the foregoing method embodiments for the specific working process of the foregoing mobile terminal and each module, and details are not described herein again.

The foregoing descriptions are merely preferred embodiments of the present application and are not intended to limit the present application. Any modifications, equivalent substitutions, improvements, etc. within the spirit and principle of the present application should be included in this Application within the scope of protection.

What is claimed is:

1. A method for filling light for a mobile terminal which comprises a main body, a first screen located on a front surface of the main body and a second screen located on a back surface of the main body, the method comprising:
   upon receiving an activating instruction for a target camera, activating the target camera;
   displaying an image acquired by the target camera on a display screen which is located on a surface different from a surface where the target camera is located;
   detecting brightness of present ambient light, and
   in response to that the brightness of the present ambient light is less than a preset brightness threshold, illuminating a display screen on the same surface where the target camera is located;
   wherein before the illuminating the display screen on the same surface where the target camera is located, the method further comprises:
   determining that a distance between the target camera and a subject is smaller than a preset distance threshold,
   wherein a zoom motor is provided in the main body;
   wherein the determining that the distance between the target camera and the subject is smaller than the preset distance threshold comprises:
   detecting a present current in the zoom motor;
   determining, according to a pre-stored correspondence between a current value and a lens pushing distance, a moving distance corresponding to the present current for the zoom motor to push the target camera;
   determining, according to a pre-stored correspondence between a lens pushing distance and a shooting distance, that the moving distance for the zoom motor to push the target camera is less than the preset distance threshold, wherein the shooting distance is a distance between the target camera and the subject.

2. The method according to claim 1, wherein before the illuminating the display screen on the same surface where the target camera is located, further comprising:
   determining that a face image is acquired by the target camera.

3. The method according to claim 1, wherein the illuminating the display screen on the same surface where the target camera is located further comprises:
   adjusting, according to the brightness of the present ambient light, a brightness level of the display screen on the same surface where the target camera is located.

4. The method according to claim 1, wherein the illuminating the display screen on the same surface where the target camera is located further comprises:
   adjusting, according to a color temperature of the present ambient light, a display color of the display screen on the same surface where the target camera is located.

5. The method according to claim 4, wherein the adjusting, according to the color temperature of the present ambient light, the display color of the display screen on the same surface where the target camera is located further comprises:
   determining, according to a pre-stored correspondence between the color temperature of ambient light and a display color, a display color corresponding to the color temperature of the present ambient light;
   adjusting the display color of the display screen on the same surface where the target camera is located to the determined display color.

6. The method according to claim 1, wherein a light sensor for detecting ambient light brightness is provided in the main body;
   wherein the detecting the brightness of the present ambient comprises:
   determining, according to a detection result of the light sensor, the brightness of the present ambient light.

7. The method according to claim 1, wherein the detecting the brightness of the present ambient comprises:
   obtaining an exposure parameter of the image acquired by the target camera;
   determining, according to the exposure parameter, the brightness of the present ambient light.

8. A mobile terminal which comprises: a main body, a first screen located on a front surface of the main body and a second screen located on a back surface of the main body;
   wherein the mobile terminal further comprises: a memory for storing instructions; a processor coupled with the memory and configured to execute the instructions stored in the memory to:
   upon receiving an activating instruction for a target camera, activate the target camera;
   display an image acquired by the target camera on a display screen which is located on a surface different from a surface where the target camera is located;
   detect brightness of present ambient light, and
   in response to that the brightness of the present ambient light is less than a preset brightness threshold, illuminating a display screen on the same surface where the target camera is located;
   wherein the processor is further configured to execute the instructions stored in the memory to:
   determine, before illuminating the display screen on the same surface where the target camera is located, that a distance between the target camera and a subject is less than a preset distance threshold,
   wherein a zoom motor is provided in the main body;
   wherein the processor is further configured to execute the instructions stored in the memory to:
   read a value of a present current flowing in the zoom motor;
   determine, according to a pre-stored correspondence between a current value and a lens pushing distance, a moving distance corresponding to the present current for the zoom motor to push the target camera;
   determine, according to a pre-stored correspondence between a lens pushing distance and a shooting distance, that the moving distance for the zoom motor to push the target camera is less than the preset distance threshold, wherein the shooting distance is a distance between the target camera and the subject.

9. The mobile terminal according to claim 8, wherein the processor is further configured to execute the instructions stored in the memory to:
   determine, before illuminating the display screen on the same surface where the target camera is located, that a face image is acquired by the target camera.

10. The mobile terminal according to claim 8, wherein the processor is further configured to execute the instructions stored in the memory to:
    adjust, according to the brightness of the present ambient light, a brightness level of the display screen on the same surface where the target camera is located.

11. The mobile terminal according to claim 8, wherein the processor is further configured to execute the instructions stored in the memory to:

adjust, according to a color temperature of the present ambient light, a display color of the display screen on the same surface where the target camera is located.

12. The mobile terminal according to claim 11, wherein the processor is further configured to execute the instructions stored in the memory to:

determine, according to a pre-stored correspondence between the color temperature of ambient light and a display color, a display color corresponding to the color temperature of the present ambient light;

adjust the display color of the display screen on the same surface where the target camera is located to the determined display color.

13. The mobile terminal according to claim 8, wherein a light sensor for detecting ambient light brightness is provided in the main body;

wherein the processor is further configured to execute the instructions stored in the memory to:

determine, according to a detection result of the light sensor, the brightness of the present ambient light.

14. The mobile terminal according to claim 8, wherein the processor is further configured to execute the instructions stored in the memory to:

obtain an exposure parameter of the image acquired by the target camera;

determine, according to the exposure parameter, the brightness of the present ambient light.

* * * * *